United States Patent
Welin et al.

(10) Patent No.: US 9,586,617 B2
(45) Date of Patent: Mar. 7, 2017

(54) STEERING INTERMEDIATE ARM

(71) Applicant: VOLVO DO BRASIL VEÍCULOS LTDA., Curitiba (BR)

(72) Inventors: Luis Fernando de Mello Welin, Curitiba (BR); Henrique Rezende, Curitiba (BR)

(73) Assignee: VOLVO DO BRASIL VEICCULOS LTDA., Curitiba (BR)

( * ) Notice: Subject to any disclaimer, the term of this patent is extended or adjusted under 35 U.S.C. 154(b) by 0 days.

(21) Appl. No.: 14/651,403

(22) PCT Filed: Dec. 28, 2012

(86) PCT No.: PCT/BR2012/000544
§ 371 (c)(1),
(2) Date: Jun. 11, 2015

(87) PCT Pub. No.: WO2014/100863
PCT Pub. Date: Jul. 3, 2014

(65) Prior Publication Data
US 2015/0321695 A1 Nov. 12, 2015

(51) Int. Cl.
*B62D 7/14* (2006.01)
*B62D 7/16* (2006.01)
*B62D 7/15* (2006.01)

(52) U.S. Cl.
CPC .......... *B62D 7/144* (2013.01); *B62D 7/1527* (2013.01); *B62D 7/16* (2013.01)

(58) Field of Classification Search
CPC .......... B62D 7/144; B62D 7/142; B62D 7/14; B62D 7/16; B62D 7/1527; B62D 7/1518; B62D 7/15; B62D 13/04; B62D 13/025; B62D 13/02; B62D 13/005; B62D 13/00; B62D 53/005; B60G 2200/44
USPC ........ 280/91.1, 426, 419, 442, 444, 99, 100, 280/102, 93.502, 93.51, 81.5; 180/24.01, 180/409, 237, 234
See application file for complete search history.

(56) References Cited

U.S. PATENT DOCUMENTS

| | | | |
|---|---|---|---|
| 842,245 A | 1/1907 | Pratt | |
| 2,202,676 A * | 5/1940 | Towson | B62D 7/142 180/253 |
| 3,481,620 A | 12/1969 | McCoy | |
| 4,163,566 A | 8/1979 | Tapp | |

(Continued)

FOREIGN PATENT DOCUMENTS

| | | | |
|---|---|---|---|
| EP | 0585209 B1 | 4/1997 | |
| JP | GB 2232133 A * | 12/1990 | ............. B62D 7/142 |

OTHER PUBLICATIONS

International Search Report (ISA/US Jun. 5, 2013) for or corresponding International application No. PCT/BR2012/000544.

(Continued)

*Primary Examiner* — Keith Frisby
(74) *Attorney, Agent, or Firm* — Martin Farrell; Michael Pruden

(57) ABSTRACT

A steering intermediate arm for linking dual steer axles on a vehicle is mountable for pivoting movement on a vehicle frame rail about a non-horizontal axis. The intermediate arm provides for a connection between a first linking rod extending rearwardly from a pitman arm and a second linking rod extending rearwardly to a steering arm of a rearward steerable axle of the dual steerable axles.

13 Claims, 7 Drawing Sheets

(56) References Cited

U.S. PATENT DOCUMENTS

| | | | |
|---|---|---|---|
| 4,468,047 A | * | 8/1984 | McGhie ............... B62D 13/005 |
| | | | 180/420 |
| 4,941,671 A | | 7/1990 | Ellingsen |
| 5,163,700 A | * | 11/1992 | Loeber .................... B60G 5/00 |
| | | | 180/24.01 |
| 5,890,558 A | | 4/1999 | Keegan |
| 6,059,056 A | | 5/2000 | Becker |
| 6,616,156 B1 | | 9/2003 | Dudding et al. |
| 2005/0279535 A1 | | 12/2005 | Priepke |
| 2008/0048414 A1 | | 2/2008 | Van Mill et al. |
| 2010/0289238 A1 | | 11/2010 | Archer et al. |
| 2011/0000735 A1 | * | 1/2011 | Karlsson ................. B62D 5/12 |
| | | | 180/440 |

OTHER PUBLICATIONS

IPRP (IPEA/US Jan. 23, 2015) for corresponding International application No. PCT/BR2012/000544.
Extended European Search Report dated Sep. 6, 2016 for corresponding European application No. 12891176.5.
1st OA dated Nov. 1, 2016 for corresponding Japan application No. 2015-549903 translated.

* cited by examiner

STEERING INTERMEDIATE ARM

FIELD OF INVENTION

This disclosure relates to a steering intermediate arm. More particularly this disclosure relates to an intermediate steering arm used on a truck having plural front axles which steer in the same direction.

BACKGROUND

Vehicle engineers are constantly looking to make improvements to steering systems. These systems are especially critical in commercial and industrial trucking since these trucks haul massive loads over a variety of terrain. The trucks may be required to cover long distances at relatively high speeds on the highway or make short runs in tight spaces on the jobsite. The steering system affects the ability for the truck to corner, as well as the ability to keep the truck moving in a straight line rolling down the highway. A properly designed steering system can also significantly reduce tire wear by avoiding skidding or "tire scrub."

Some work trucks, an example being shown in FIG. 1, are designed with dual or twin front axles 5, 10, each carrying steerable front wheels. A forward steer axle 5 is shown at the front end of the vehicle under the cab 3 and a rearward steer axle 10 is rearward of the forward steer axle, forward and rearward being relative to the vehicle. These twin front axles increase the load capacity of the truck and improve the weight distribution of the loaded truck between the front axles and the rear axles, allowing the truck to more easily traverse roadways with loose surfaces.

To achieve the least possible tire wear, the proper angle of deflection for each wheel needs to be established based on the desired radius of the turn. A schematic of these deflection angles is shown in FIG. 2. The optimal angle of deflection will require each wheel to follow its own circular path around the same center. As a result, the inner wheels, relative to the curve, should be turned more than the outer wheels, and the wheels of the rearward front axle should be turned more than the wheels of the forward front axle.

One prior art steering system for these trucks with dual front axle steering is shown in FIG. 3. The steering system includes a steering gear 20, a pitman arm 24, and a steering intermediate arm 28. The pitman arm 24 anchors two linking rods 32, 33; one linking rod attaches to the intermediate arm 28 and the other attaches to a forward steering arm 36 of the forward front axle 5. Extending rearward from the intermediate arm 28 is another linking rod 34 that connects to a rearward steering arm 37 of the rearward front axle 10. Also extending rearward of the intermediate arm 28, is a power assist piston 40 that uses hydraulics to assist the pivoting motion of the intermediate arm 28.

As can be seen from FIG. 3, the intermediate arm 28 of the prior art fills a large packaging space due to its method of attachment and orientation with respect to the frame. The intermediate arm 28 pivots relative to the vehicle frame 44 about a horizontal axis 29. This motion requires a long arm to achieve the desired degree of travel for the points of attachment to the linking rods 32, 33, 34. Further, several substantial bends in the rod 32 are required to connect the linking rod 32 between the pitman arm 24 and the intermediate arm 28. The bends significantly reduce the stiffness of the linking rod 32, which adversely affects the responsiveness of the steering system.

Accordingly, there is a need for a steering system that links the movement of a first and second set of truck wheels while providing the proper cornering geometry. There is a need for a system having sufficient stiffness for improved straight run performance. There is also a need for a system which can be packed into the already crowded space around the front end of the truck chassis.

SUMMARY

In one embodiment, this disclosure covers a steering intermediate arm. The arm can be capable of pivoting relative to a vehicle frame rail about a non-horizontal axis.

In another embodiment, this disclosure covers a steering system for a vehicle having twin front axle steering. The system can include an intermediate arm attached to a vehicle frame rail. The intermediate arm is able to pivot relative to the frame rail about a non-horizontal axis.

In another embodiment, this disclosure covers a truck having an operator cab on a frame. The frame supports a first front axle with steerable wheels and a second front axle with steerable wheels. The truck includes a steering system for the steerable wheels which has an intermediate arm attached to the frame between the first axle and the second axle, a first linking rod pivotally connected to the intermediate arm and extending toward the first axle, and a second linking rod pivotally connected to the intermediate arm and extending toward the second axle. The intermediate arm pivots relative to the frame about a substantially vertical axis.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
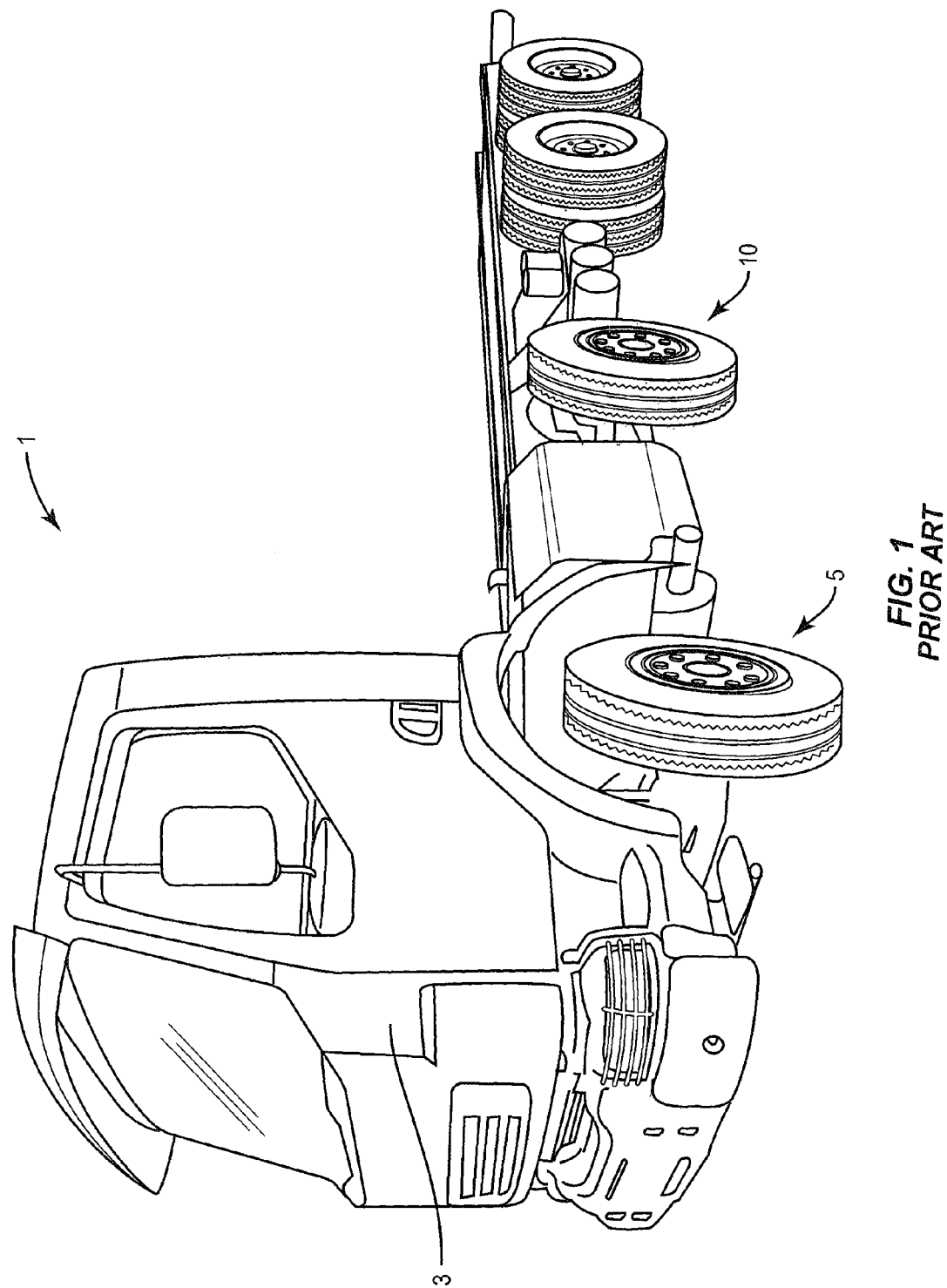
FIG. 1 is a prior art exemplary truck equipped with dual steering front axles.
Figure 2:
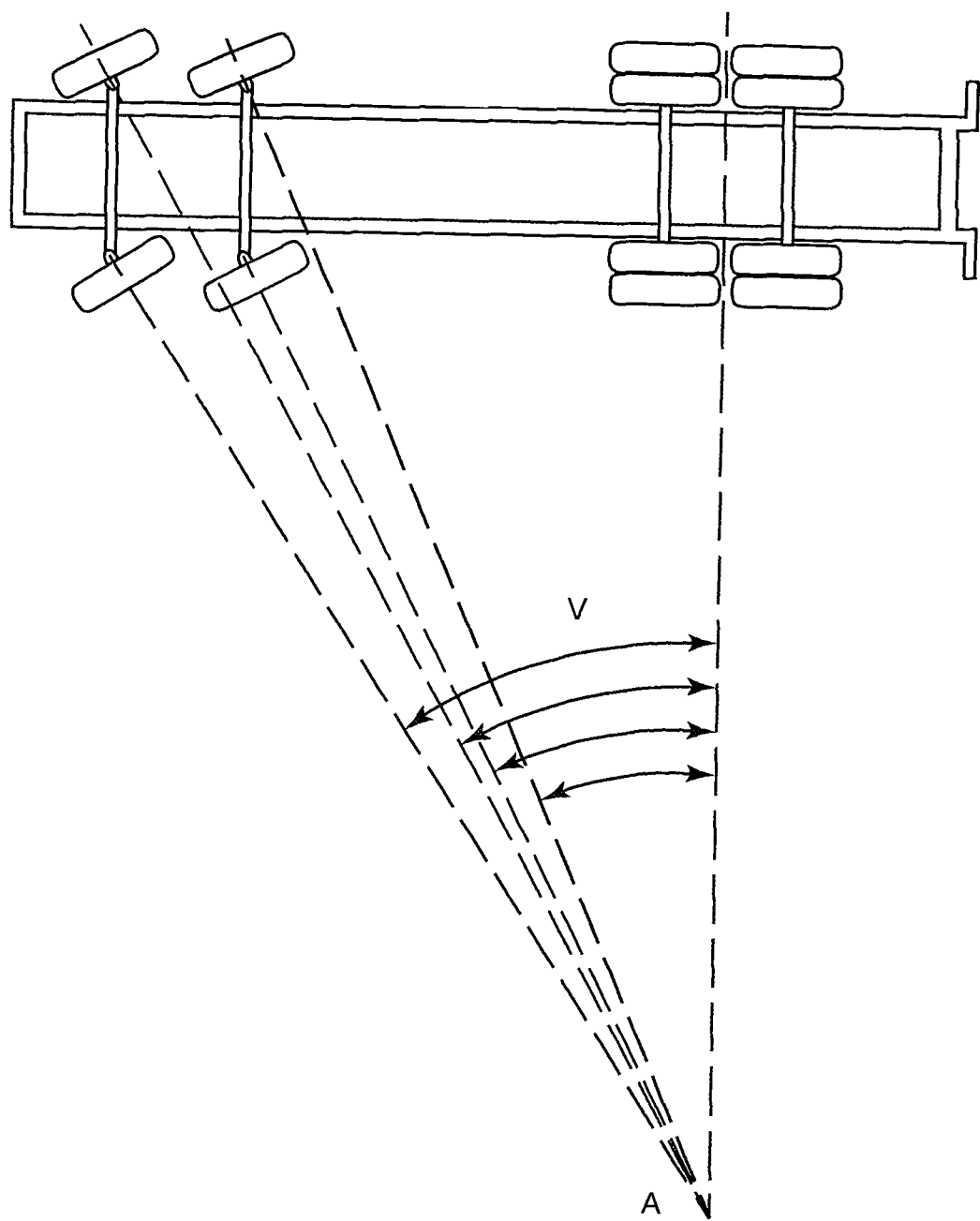
FIG. 2 is a schematic diagram of the steering geometry for a prior art dual steering front axle system.
Figure 3:
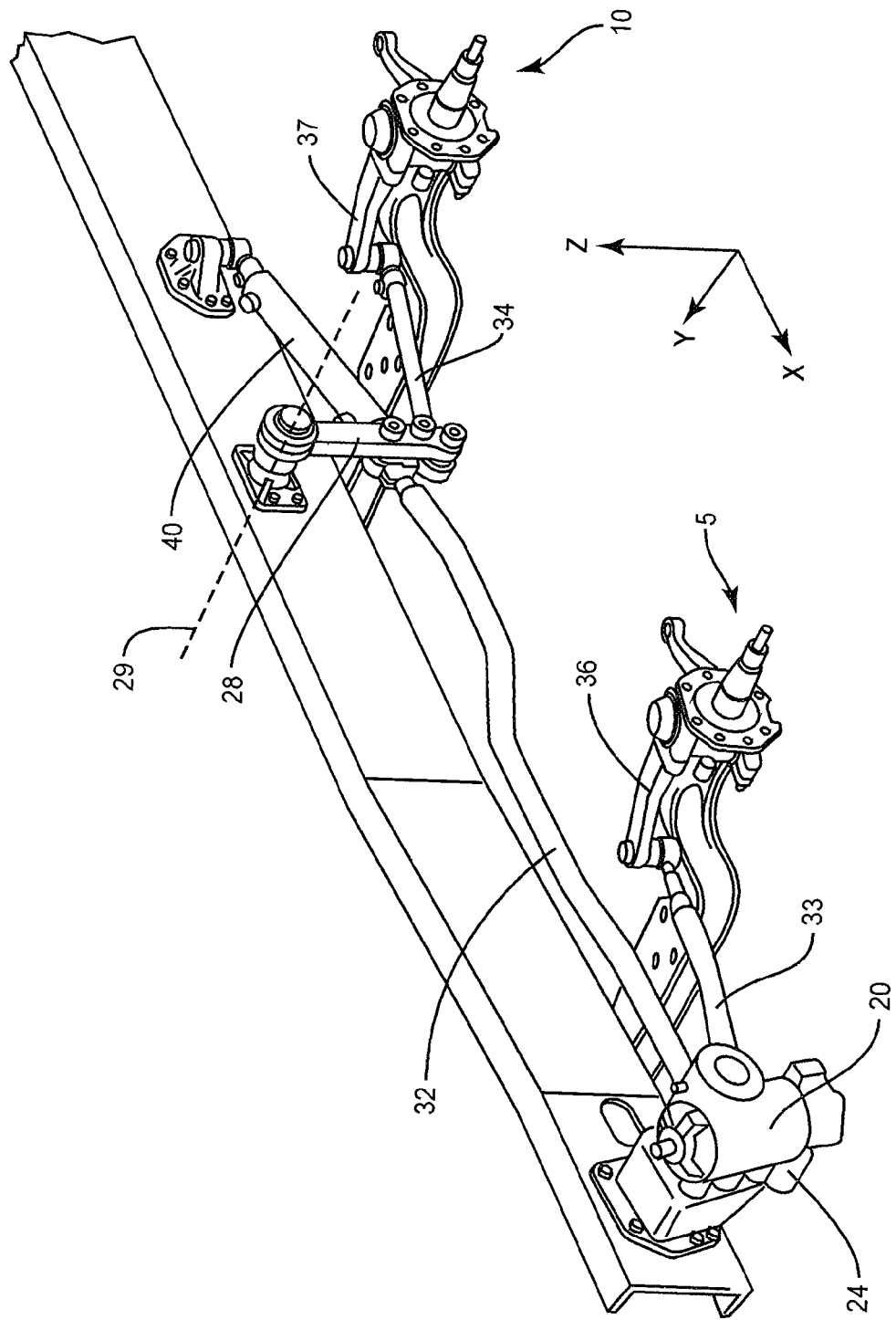
FIG. 3 is prior art steering system used in trucks with dual steering front axles.
Figure 4:
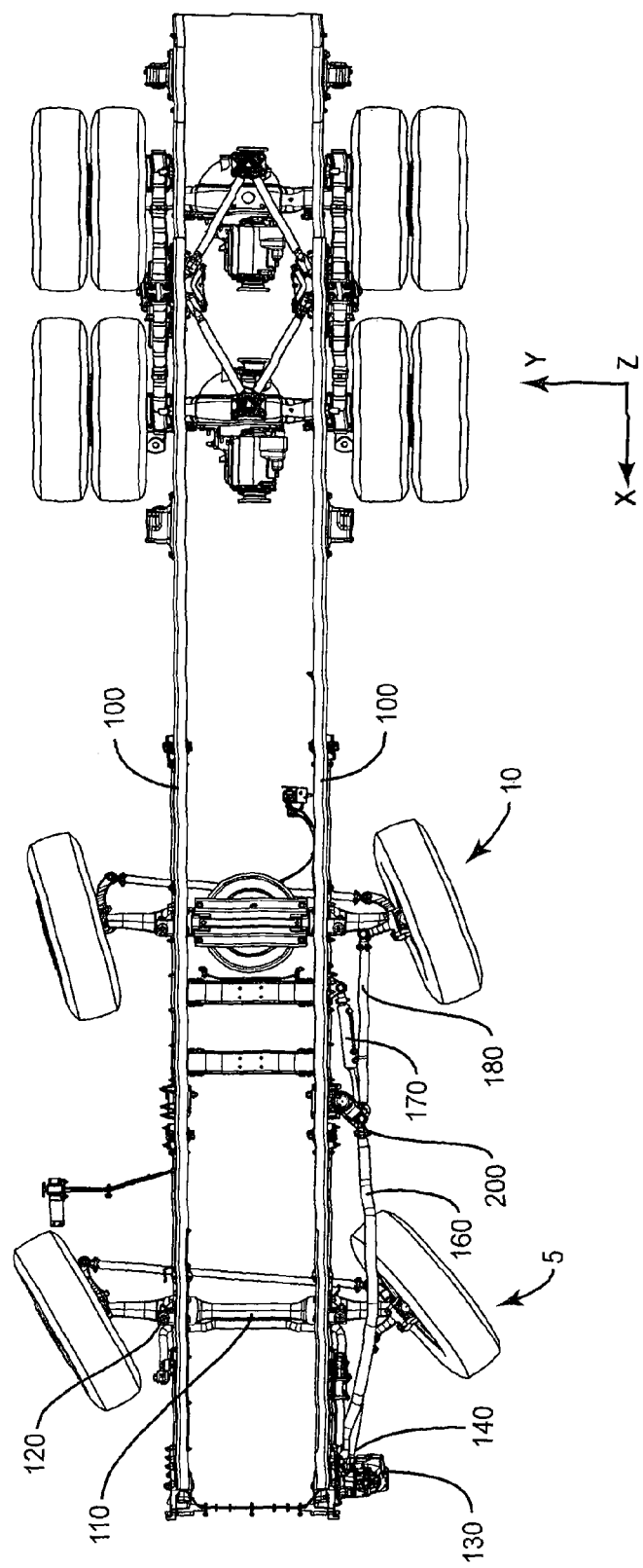
FIG. 4 is an exemplary top view of the steering system of the present invention as attached to a truck frame.
Figure 5:
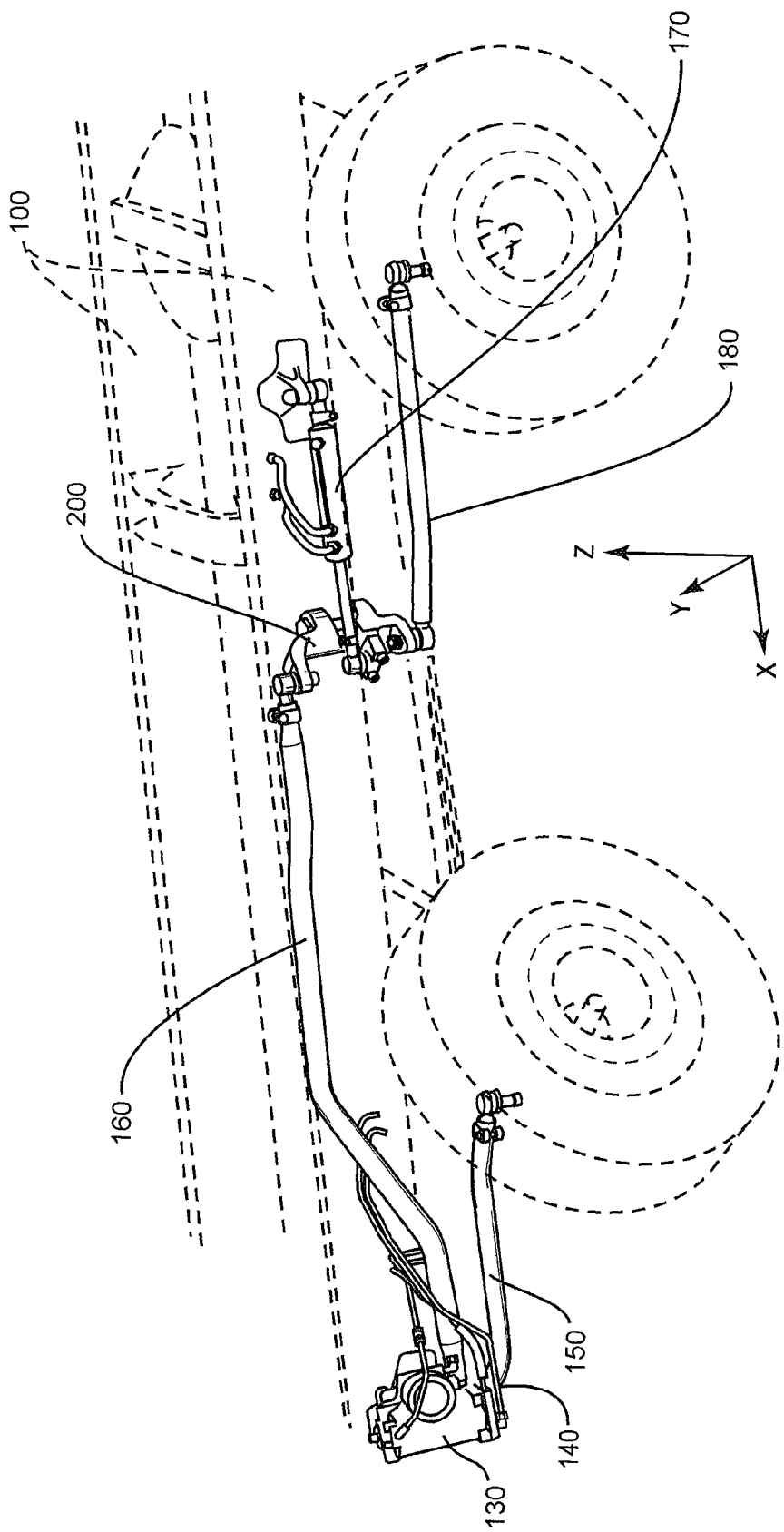
FIG. 5 is an exemplary perspective view of the steering system of the present invention in combination with the truck frame.

Referring now to the figures in more detail, FIGS. 4 and 5 show a steering system of the invention in relation to the underbody or frame of the truck 1. The truck 1 can include a set of frame rails 100 for supporting a truck body. The frame rails 100 also support the wheel axles 110 using suspension components (not shown). The steering system of the invention is intended to be used on a truck or similar vehicle, and the orientation and arrangement of the various components of the system are described here in relation to a truck frame. For the purposes of this description, an axis substantially parallel to the longitudinal axis of the frame rails 100 defines the X-axis. An axis substantially parallel with the wheel axles and orthogonal to the X-axis defines the Y-axis. An axis which is substantially perpendicular to both the X-axis and the Y-axis defines the Z-axis. As used herein, the X-axis and Y-axis define a horizontal plane and the Z-axis defines a vertical direction. Also, an X-axis is also referred to as a longitudinal axis, a Y-axis is also referred to as a transverse axis, and a Z-axis is also referred to as a vertical axis.

FIGS. 4 and 5 further show the steering gear 130 which is attached to a pitman arm 140 to convert driver input on the steering wheel to mechanical motion for pivoting the wheels. The pitman 140 arm is connected to a first forward link rod 150, which transfers the motion of the pitman arm to the front-most wheels. The pitman arm 140 is also connected to a second forward link rod 160, which is the first relay component in the system of pivoting the wheels on the rearward front axle 10. The performance and stiffness of the steering system is improved by designing the second forward link rod 160 as linearly as possible. In the exemplary embodiment shown in FIG. 5, the second forward link rod 160 is straightest when traveling along the top of the frame rail 100. A relatively linear second forward link rod 160 can provide the desired stiffness and eliminate the need or additional rods or more than one intermediate arm 200.

Figure 6:
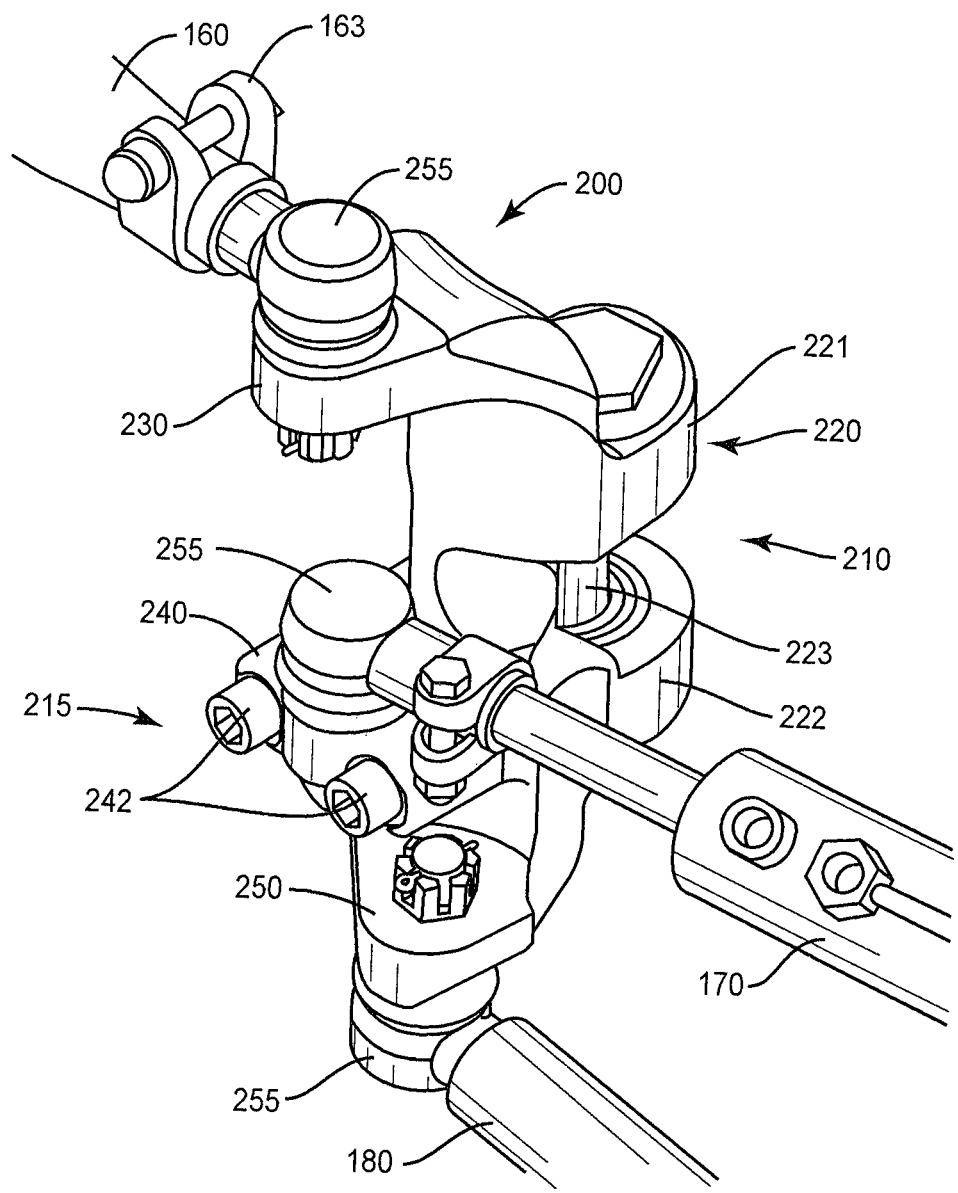
FIG. 6 is an exemplary view of the intermediate arm with the other steering components attached.
Figure 7:
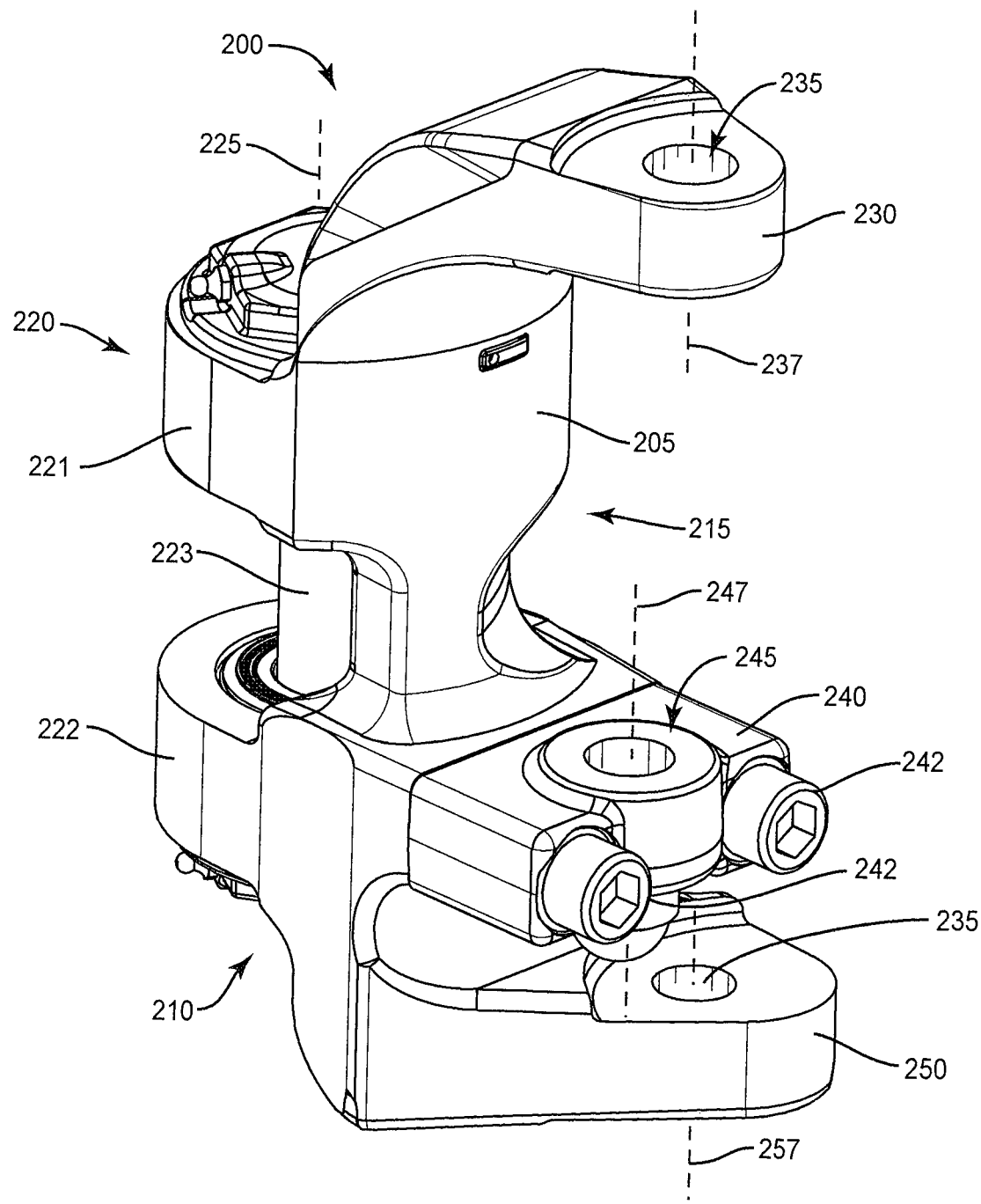
FIG. 7 shows a detailed view of the steering intermediate arm according to one embodiment of the present invention.

An intermediate steering arm 200, as best seen in FIGS. 6 and 7, supports the second forward link rod 160 at the desired raised position and connects it to a rear link rod 180 to transmit steering force to the rearmost steer axle 10. The second forward link rod 160 may include a clamp 163 and sleeve arrangement to maintain a proper length. The intermediate steering arm 200 is located behind the frontmost set of steerable wheels 5 and in front of a second set of steerable wheels 10. As shown in FIGS. 6 and 7, the intermediate steering arm 200 has a body portion 205 having an inward side 210 facing the frame rail 100 when mounted thereon, and an outward side 215 facing away from the frame rail 100 when mounted thereon. The body portion 205 extends in length in a first direction which, when mounted on the frame rail 100 as shown in FIG. 5, can be a vertical axis. The inward side 210 can include a connection portion 220 extending therefrom to mount the intermediate steering arm 200 to a frame rail. In the illustrated embodiment, the connection portion 220 includes a first lug 221 and a second lug 222 extending transversely from the body portion 205. The lugs 221, 222 are spaced apart from one another along the length of the body portion 205. In a preferred embodiment, each lug 221, 222 carries a bearing to support a pivot pin 223 or bolt, which allows the connection portion 220 to be mounted to the frame rail 100 for pivoting movement about a non-horizontal and preferably vertical pivot axis 225 defined by the lugs 221, 222. The connection portion 220 may be pivotally mounted to the frame by any method known in the art, including a projection (not shown) welded to the frame rail 100 configured to accept the bolt 223 shown as part of the connection portion 220. The steering arm 200 remains in close proximity to the rail 100 and provides a small packaging envelope in an area of the truck where space is at a premium when the pivot axis 225 is not horizontal. Preferably, the pivot axis 225 can be more vertical than not, i.e. forming less than an about 45 degree angle with a Z-axis. Even more preferably, the pivot axis can be substantially vertical. The pivot axis 225 also allows for a directionally direct transfer of motion. The movement from the pitman arm is never reversed, which would otherwise occur when using additional intermediate arms.

The outward side 215 of the steering arm 200 can include a plurality of protrusions or projections 230, 240, 250 to connect the steering arm to the link rods. As shown, the projections 230, 240, 250 extend laterally from the body portion 205 and are spaced from one another along the length of the body portion 205. The projections 230, 250 can be integrally formed with the body 205, or the projections 240 can be attached to the body 205 using fasteners 242. Each projection 230, 240, 250 has a through-hole 235 or groove 245 to allow each projection to be pivotally connected to a component of the steering system. As seen in FIG. 7, each pivotal connection provides the ability for rotation about an axis 237, 247, 257 substantially parallel to the pivot axis 225.

In the exemplary embodiment shown in FIGS. 6 and 7, the first, uppermost protrusion 230 connects the second forward link rod 160 to the intermediate arm 200. The second protrusion 240 provides a connection point for a power assist piston 170. The power assist piston 170 is a commonly known component of truck steering systems which use hydraulic power to assist in pivoting the intermediate arm 200. However, the intermediate arm 200 of the present disclosure provides a steering system capable of functioning without the help of piston 170 should the need arise. In some countries, safety regulations require steering systems to function without a piston 170, but unlike the system of the present disclosure, most prior art systems pass these regulations by adding a backup power assist.

An exemplary embodiment includes a third protrusion 250 for pivotal connection with a rear link rod 180. The rear link rod 180 transfers the motion of the intermediate arm 200 to the rearward front wheels 10.

In an exemplary embodiment, connection with each of the protrusions 230, 240, 250 is provided by a ball joint 255, as best seen in FIG. 6. The ball joints 255 provide necessary degrees of freedom of movement and reduce the potential for fatigue or cracking at the protrusions. It would however be possible to use other forms of pivoting connection such as mere bolts and washers.

The rotation axes 237, 247, 257 defined by the holes 235 or grooves 245 of the respective projections 230, 240, 250 may coincide or may be offset from one another. In the embodiment shown in FIGS. 6 and 7, the axes are offset from one another. In other words, a plane passing through the axis of a given projection and bisecting that projection may form a variety of angles relative to a plane defining the outward side 215 of the body portion 205. The flexibility of the respective axis positions allows for each projection connection point to be properly positioned to provide the pre-determined travel necessary to correctly steer each wheel through the proper angle.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. An apparatus comprising a steering intermediate arm capable of pivoting relative to a vehicle frame rail about a first pivot axis, the first pivot axis being non-horizontal;
   wherein the intermediate arm has a body portion extending in a first direction and a connection portion extending in a second direction perpendicular to the first direction on an inner side relative to the vehicle; the connection portion allowing the intermediate arm to be mounted to pivot on the first pivot axis relative to the frame rail; and
   wherein the intermediate arm is adapted to be pivotally disposed between a forward linking rod and rearward linking rod.

2. An apparatus according to claim 1 wherein the first pivot axis is angled less than about 45 degrees from a vertical axis.

3. An apparatus according to claim 2 wherein the first pivot axis is substantially vertical.

4. An apparatus according to claim 1 wherein the intermediate arm has at least one projection extending in a second direction perpendicular to the first direction on an outer side relative to the vehicle, the at least one projection having a through-hole to define at least a second pivot axis.

5. An apparatus according to claim 4 wherein the at least one projection provides a connection point for one of the forward linking rod, the rearward linking rod and a power assist piston; the connection point allowing pivotal movement about the second pivot axis.

6. An apparatus according to claim 4, wherein the at least one projection comprises three projections providing pivotal connection points for the forward linking rod, the rearward linking rod and a power assist piston respectively.

7. A steering system for a vehicle having twin front axle steering, the system comprising:
   an intermediate arm mountable on a vehicle frame for pivotal movement about a first pivot axis, wherein the first pivot axis is non-horizontal, wherein the intermediate arm includes a body portion extending in a first direction and two lugs extending from the body portion in a second direction, the lugs being spaced in a direction defining the first pivot axis and carrying a pivot pin, the intermediate arm being mountable to the vehicle frame by the lugs and pivot pin;
   a first linking rod extending forward from the intermediate arm toward a first axle having steerable wheels; and
   a second linking rod extending rearward from the intermediate arm toward a second axle having steerable wheels.

8. A steering system according to claim 7, wherein the first pivot axis is angled less than about 45 degrees from a vertical direction of the vehicle frame.

9. A steering system according to claim 8, wherein the first pivot axis is substantially vertical.

10. A steering system according to claim 7, wherein the intermediate arm has an outer side defined relative to the vehicle frame; the outer side comprising at least one projection for connection to at least one of the first linking rod and the second linking rod.

11. A steering system according to claim 10, wherein each of the at least one projection includes a through-hole to define a second pivot axis.

12. A steering system according to claim 11, wherein the at least one projection is connected to one of the first linking rod and the second linking rod by a ball joint.

13. A truck comprising:
   an operator cab on a frame;
   a first front axle with steerable wheels supported below the frame;
   a second front axle with steerable wheels supported below the frame; and
   a steering system comprising:
   an intermediate arm pivotably attached to the frame between the first axle and the second axle to pivot on a vertical axis, wherein the intermediate arm has a body portion extending in a first direction and a connection portion extending in a second direction perpendicular to the first direction on an inner side relative to the vehicle; the connection portion allowing the intermediate arm to be mounted to pivot on the vertical axis relative to the frame;
   a first linking rod pivotally connected to the intermediate arm and extending toward the first axle; and
   a second linking rod pivotally connected to the intermediate arm and extending toward the second axle.

* * * * *